April 17, 1928.
J. R. SNYDER
1,666,357
SHOCK ABSORBER
Filed Oct. 10. 1924
2 Sheets-Sheet 1
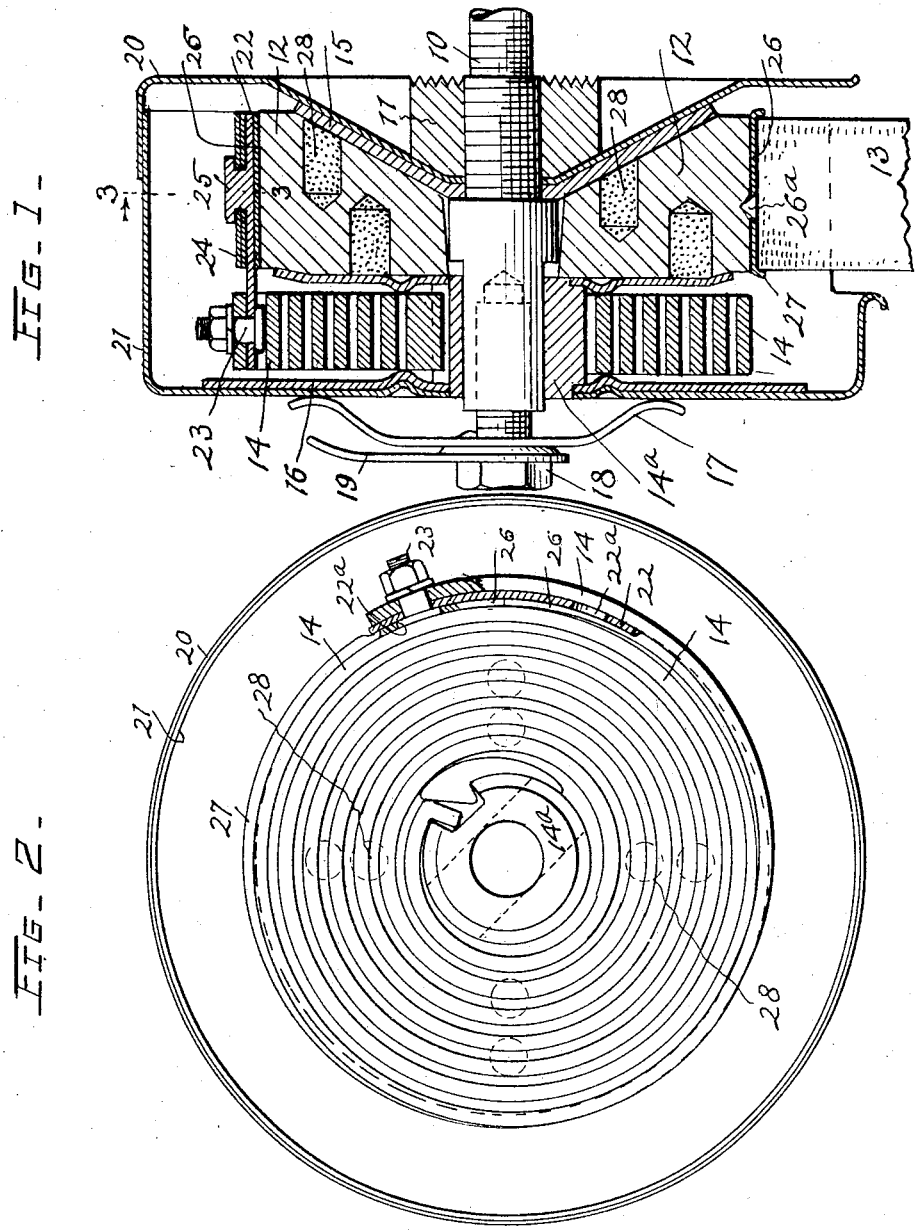
Inventor
Jacob R. Snyder.
Thurston Kwis + Hudson
attys April 17, 1928.
J. R. SNYDER
1,666,357
SHOCK ABSORBER
Filed Oct. 10, 1924
2 Sheets-Sheet 2
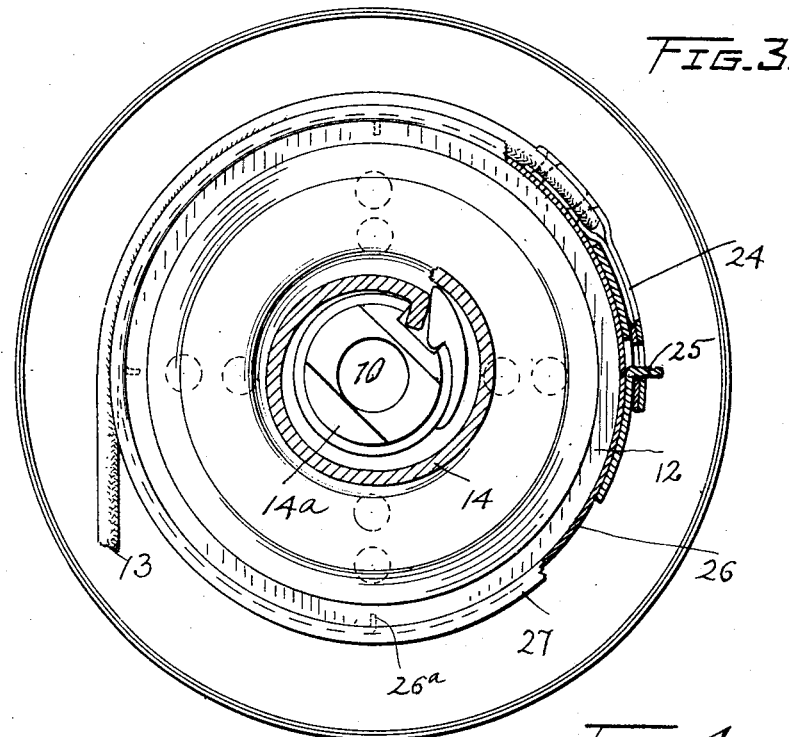
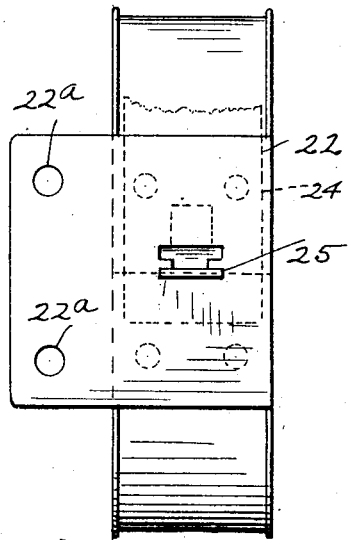
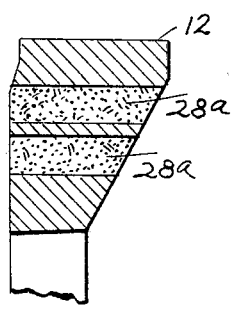
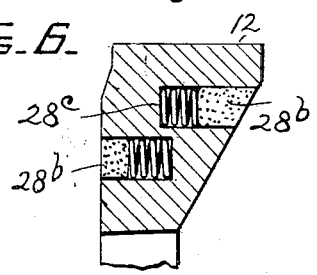

Patented Apr. 17, 1928.

1,666,357

UNITED STATES PATENT OFFICE.

JACOB R. SNYDER, OF CLEVELAND, OHIO, ASSIGNOR TO THE STAR REBOUND CONTROLLER COMPANY, OF CLEVELAND, OHIO, A CORPORATION OF OHIO.

SHOCK ABSORBER.

Application filed October 10, 1924. Serial No. 742,785.

This invention relates to shock absorbers of the type illustrated in my prior Patent No. 1,502,755, granted July 29, 1924, and it embraces certain improvements thereon, the object being to improve the operation and the life or durability of the shock absorber.

In one aspect the invention relates to an improved means of connecting the outer end of the coil spring to the drum and to the belt or strap which is adapted to be wound onto and unwound from the drum, the attaching means serving also as a support for the outer portion of the spring for a purpose to be explained.

In another aspect the invention relates to certain details of the drum by which better lubrication is provided at the sides thereof which are engaged by the relatively stationary friction disks.

The invention may be further briefly summarized as consisting in certain novel details of construction, and combinations and arrangements of parts which will be described in the specification and set forth in the appended claims.

In the accompanying sheets of drawings wherein I have shown the preferred embodiment of the invention, Fig. 1 is a sectional view through the improved shock absorber, the section being in the plane of the axis; Fig. 2 is a side view with a part of the casing and certain other parts removed, and the parts in section; Fig. 3 is a similar view with a portion of the spiral spring removed and certain portions in section substantially along the line 3—3 of Fig. 1, looking in the direction indicated by the arrows; Fig. 4 is an edge view of the drum showing the means for supporting the outer convolution of the drum, and for attaching it and the spring to the drum; and Figs. 5 and 6 are fragmentary sectional views of the drum showing slightly different modifications in the way of lubricating the side surfaces of the drum.

As the present shock absorber, aside from certain improvements to be referred to, is similar to that of my prior patent, a brief description of the main elements will suffice.

The shock absorber includes a stationary center-bolt 10, onto which is screwed a fitting member 11, adapted to be employed in fastening the shock absorber to the chassis frame of a motor vehicle, this shock absorber, like that of my patent, being adapted particularly for motor vehicle use.

Rotatable about the central annular part of the center-bolt is a drum 12, preferably formed of oil impregnated wood, the drum being adapted to receive a belt or strap 13. At the side of the drum is a coil or clock type spring 14 the inner end of which is held stationary by being attached to a spring support 14ª non-rotatably fitted onto the center-bolt. The outer end of this spring is adapted to be connected to the drum in the manner hereinafter explained.

The drum is rotated in both directions as the belt is unwound and wound onto the drum. That is to say, during the compression movement of the main springs of the vehicle, the drum is rotated in one direction so as to wind the strap thereon, and during the rebound movement the pull on the strap rotates the drum in the opposite direction so that the strap is unwound or uncoiled from the drum and the spring 14 is wound up.

Both movements of the drum are frictionally opposed by a pair of friction disks 15 and 16 which engage opposite sides of the drum, these friction disks being held stationary, the disk 15 being in this instance clamped against the shoulder of the center-bolt by the nut or fitting member 11, and the disk 16 being pressed yieldingly against the drum, and the latter against the disk 15 by the action of an external spring 17, the tension of which can be adjusted by turning a cap-screw 18 in the end of the center-bolt, an indicator 19 being preferably provided and arranged to rotate with the nut to serve as an indication of the tension imposed in spring 17.

The shock absorber also includes a stationary casing or housing consisting of two telescopic parts 20 and 21, the former being clamped against the outer side of friction disk 15 by the nut 11, and the casing part 21 being fitted on the end of the spring support 14ª. As in my prior patent, the pressure of spring 17 is transmitted from the casing part 21 through the spring support 14ª to the friction disk 16.

In my prior patent referred to, the outer end of the coil spring 14 is connected to the inner end of the strap by means of a swivel hook, capable of swinging in and out as the spring coils up and uncoils. That is to say, there is no direct mechanical connection between the spring or strap and the drum, although the tension of the spring 14 and the resistance to drum movement created by the friction of disks 15 and 16 are so proportioned that the drum is rotated by the action of the spring on the belt during the compression movement of the main springs, as already stated, the tension of the spring keeping the belt sufficiently tight on the drum so that the drum is rotated as the strap is wound onto it by the spring, and, of course, it is rotated in the opposite direction as the belt is pulled out during the rebound stroke. That construction was found to answer the purpose, but resulted in some noise as the spring was coiled up and uncoiled, and there was an unnecessary flexing of the spring by reason of the fact that it was not maintained concentric, or substantially concentric with the axis of the shock absorber.

With the present construction, the spring, strap and drum are fastened together, and the outer portion of the spring is supported by a fastening element. This result is obtained by attaching to the periphery of the drum a curved plate 22, which in this instance extends for about 30° about the periphery of the drum, but its circumferential length may increase or decrease as may be found necessary. As will be seen by reference to Fig. 1, the plate 22 extends laterally of the drum and the end portion of the outer convolution of the spring extends over and rests upon this plate and is secured to it by any suitable means, in this instance by a short bolt 23. Thus the laterally projecting portion of plate 22 forms a rigid support for the outer end of the spring, this support being curved in conformity with the annular curvature of the drum and in substantial accordance with the actual curvature of the spring, the result being that this member forms the attaching means for the spring and serves to support the outer convolution of the spring, and to keep the spring substantially concentric so that the various coils are in the main kept out of engagement with each other when the shock absorber is in action, and the spring is therefore substantially noiseless and the liability of crystallization is minimized.

The strap 13 is also fastened to this plate 22, and this is preferably accomplished by riveting or otherwise fastening to the end of the strap a metal clip 24, and by hooking this clip to the plate. This is done preferably by punching from the center of the plate 22, an upstanding substantially T-shaped lug 25, and by providing an opening in the clip of sufficient length and width that by turning the clip at right angles to the position which it normally assumes on the drum, then extending the lug through the opening of the clip, and then turning the clip to its natural position on the drum, the clip is prevented from becoming disengaged from the lug.

The plate 22 may be fastened to the periphery of the drum in different ways, but I prefer to encircle the periphery of the drum with a relatively thin metal strip 26, preferably provided at its edges with outwardly extending flanges 27 to serve as guides for the strap 13. The strip 26 is fastened to the periphery of the drum preferably by driving into the drum spurs 26ª struck from the strip. Then the plate 22 is fastened to this strip 26 in any suitable way, but preferably by spot welding. In this manner the plate to which both the spring and the strap are attached is secured to the periphery of the drum in an inexpensive but very effective manner, and at the same time the intermediate element in the form of the strip 26 which completely encircles the drum and is fastened to it, serves as a guide for the strap by reason of the peripheral outstanding flanges 27.

It will be observed, particularly by reference to Fig. 4, that the T-shaped lug 25 is on the center line of the plate 22, and that the laterally projecting portion of the plate has two openings designated 22ª, to receive the bolt for attaching the spring thereto. These features insure universal adaptation of the drum, i. e. they enable the drum to function in a clockwise or counter-clockwise shock absorber without changing any of the parts. That is to say, the direction in which the spring and strap extend can be reversed with respect to the drum.

Another feature involves the more effective lubrication of the surfaces of the drum than is obtained merely by the oil impregnation of the drum. In accordance with the present invention, the drum is provided with grease or lubricant filled pockets, which open out to opposite sides of the drum, where the sides are engaged by the friction disks 15 and 16. These openings may extend only part way through the drum from opposite sides, as shown at 28 in Fig. 1, or they may extend entirely through the drum, as shown at 28ª in Fig. 5. In either event they are preferably staggered so that as the drum rotates between the friction disks, practically all portions of the drum engaging surfaces thereof will receive lubrication. A stiff but semi-soft lubricant may be employed, or a hard lubricant of the graphitic type may be utilized, as illustrated at 28ᵇ in Fig. 6. In this event, springs 28ᶜ may be employed behind the lubricant pieces to press them yieldingly outward against the friction disks.

By these improvements, so-called dry spots on the friction disks are eliminated, and the rubbing or sliding action of the drum on the disks is rendered noiseless. It might be stated that in my prior patent the oil impregnation of the drum alone was relied on, and while that answered the purpose quite effectively, I find that the additional lubrication as contemplated herein, is even more effective, as it practically eliminates all noise from the rubbing surfaces. Even after long use the drum shows practically no wear.

By the improvements above explained, the shock absorber is rendered practically noiseless in action, the life or durability of the parts is increased, and the spring breakage due to crystallization is minimized.

I do not desire to be confined to the precise details shown, but aim in my claims to cover all modifications which do not involve a departure from the spirit and scope of my invention.

Having described my invention, I claim:

1. A shock absorber comprising a rotatable drum, a strap adapted to be wound onto and unwound therefrom, a spring for rotating the drum in one direction, and a combined attaching means and spring support extending from the side of the drum.

2. In a shock absorber, a rotatable drum, a strap adapted to be wound onto and unwound therefrom, a spring for rotating the drum in one direction, and a member projecting laterally from the drum, the outer portion of the spring being supported on this member and attached to it.

3. In a shock absorber, a rotatable drum, a strap adapted to be wound onto and unwound therefrom, a spring for rotating the drum in one direction and an arc-shaped plate secured to the drum and projecting laterally therefrom, a portion of the outer convolution of the spring being supported by said plate.

4. In a shock absorber, a rotatable drum, a strap adapted to be wound onto and unwound therefrom, a spring for rotating the drum in one direction and an arc-shaped plate secured to the drum and extending between the two outermost convolutions of the spring, said spring being attached to the plate.

5. In a shock absorber, a rotatable drum, a strap adapted to be wound onto and unwound therefrom, a spring for rotating the drum in one direction and a member attached to the drum and projecting laterally thereof and having different portions to which the strap and spring are connected.

6. In a shock absorber, a rotatable drum, a strap adapted to be wound onto and unwound therefrom, and an arc-shaped plate attached to the periphery of the drum, and having means to which the end of the strap is attached.

7. In a shock absorber, a rotatable drum, a strap adapted to be wound onto and unwound therefrom, and a strip enveloping the drum and attached thereto, and having means to which the strap is attached.

8. In a shock absorber, a rotatable drum, a strap adapted to be wound onto and unwound therefrom, a spring associated with the drum, a strip enveloping the drum and attached thereto, and having means to which the outer end of the spring is attached.

9. In a shock absorber, a rotatable drum, a strip enveloping the drum and attached thereto, a strap adapted to be wound onto and unwound therefrom, and having means to which the inner end of the strap and the outer end of the spring are attached.

10. In a shock absorber, a rotatable drum, a strap adapted to be wound onto and unwound therefrom, a spring associated with the drum, and a metal strip enveloping the drum and secured thereto, and having means to which the strap and spring are attached, said strip having outstanding means serving as a guide for the strap.

11. In a shock absorber, a rotatable drum, a strap adapted to be wound onto and unwound therefrom, a spring associated with the drum, and a metal strip enveloping the drum and secured thereto, and having means to which the strap and spring are attached, said strip having peripheral outstanding flanges serving as a guide for the strap.

12. In a shock absorber, a rotatable drum, a strap adapted to be wound onto and unwound therefrom, a spring associated with the drum, a strip enveloping the drum and attached thereto, and having a member with a portion to which the end of the strap is attached, and a laterally projecting portion to which the end of the spring is attached and on which it is supported.

In testimony whereof, I hereunto affix my signature.

JACOB R. SNYDER.